United States Patent [19]
Offer

[11] 3,845,559
[45] Nov. 5, 1974

[54] FILTER ELEMENT SELECTOR
[75] Inventor: Robert J. Offer, Racine, Wis.
[73] Assignee: Tenneco Inc., Racine, Wis.
[22] Filed: Aug. 7, 1972
[21] Appl. No.: 278,609

[52] U.S. Cl. ............................ 33/143 M, 33/180 AT
[51] Int. Cl. ............................................ G01b 5/00
[58] Field of Search .......... 33/158, 143 M, 125 R, 33/180 AT, 181 AT, 336, 143 R

[56] References Cited
UNITED STATES PATENTS

| | | | |
|---|---|---|---|
| 1,129,937 | 3/1915 | Wilson | 33/143 M |
| 2,003,556 | 6/1935 | Saballus | 33/180 AT |
| 2,874,478 | 2/1959 | Faulconer | 33/143 M |
| 3,138,876 | 6/1964 | Graham | 33/143 M |
| 3,222,794 | 12/1965 | Pereue et al. | 33/336 |
| 3,391,462 | 7/1968 | Craine | 33/143 M |
| 3,696,511 | 10/1972 | Bixler et al. | 33/125 R |

*Primary Examiner*—William D. Martin, Jr.
*Attorney, Agent, or Firm*—Harness, Dickey & Pierce

[57] ABSTRACT

A device for specifying the model number of a replacement air filter element upon measurement of the old filter element being replaced comprises a channel having a face with the model numbers thereon forming indicia on a scale and fixed and movable stops on the channel and cooperating with the scale for measuring dimensions of the filter element.

9 Claims, 8 Drawing Figures

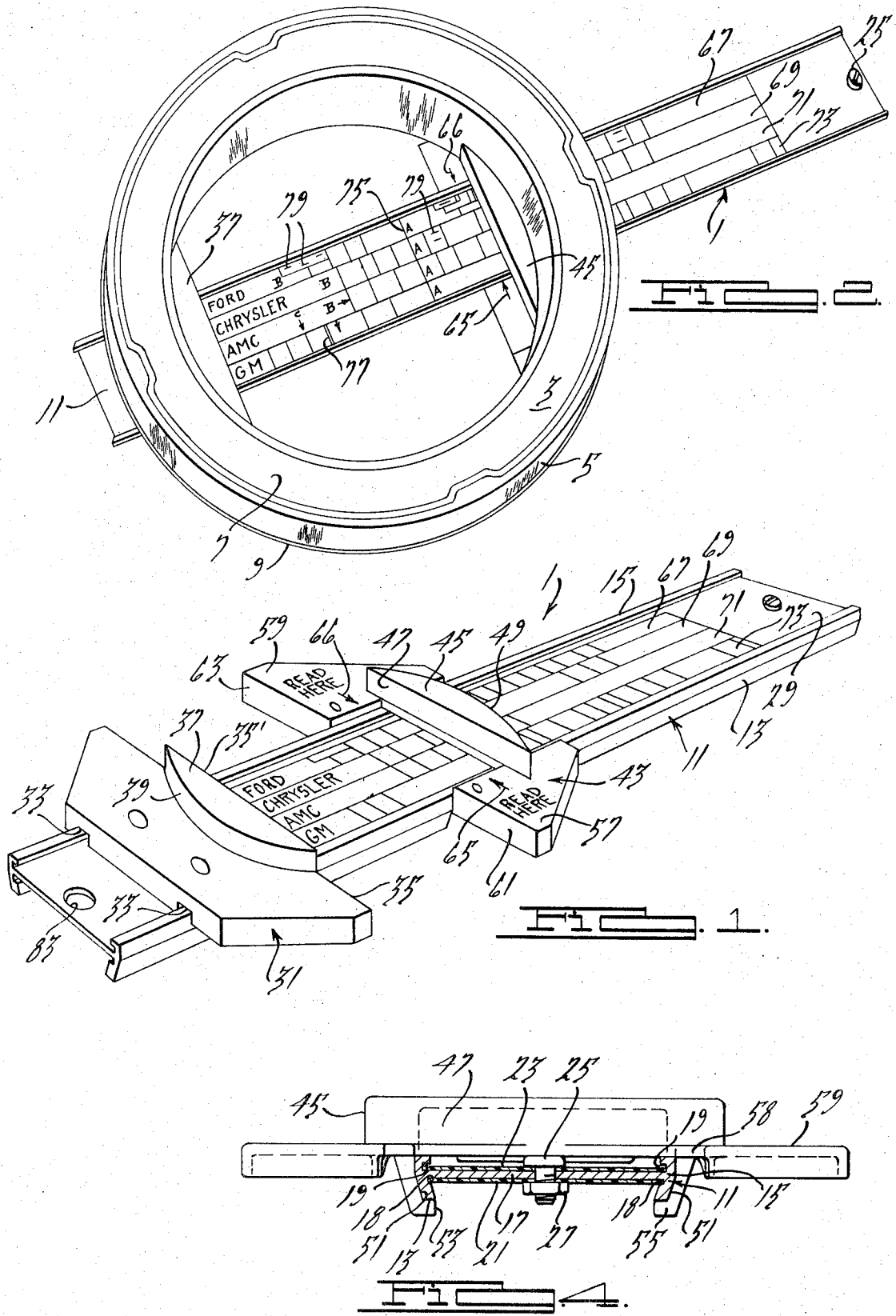

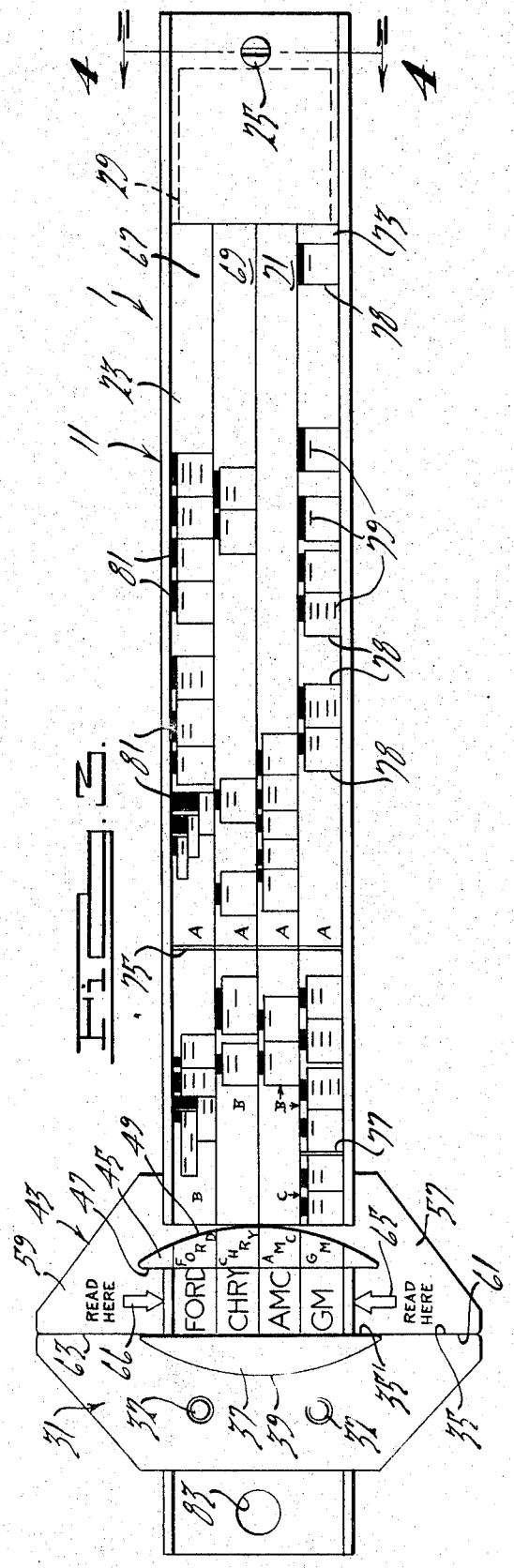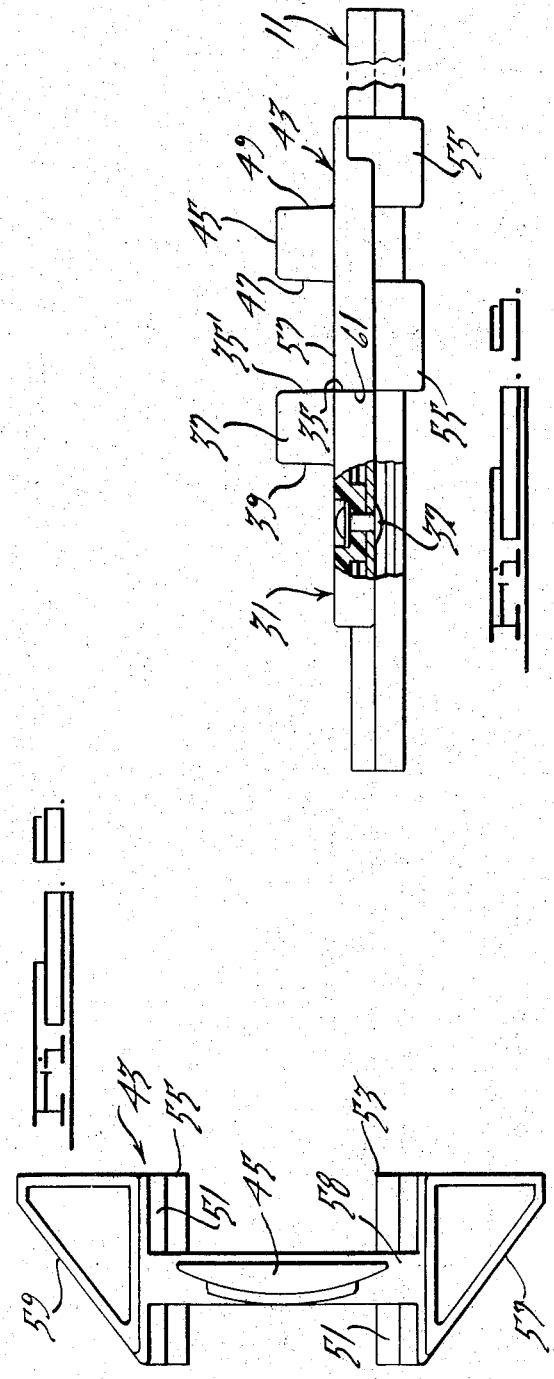

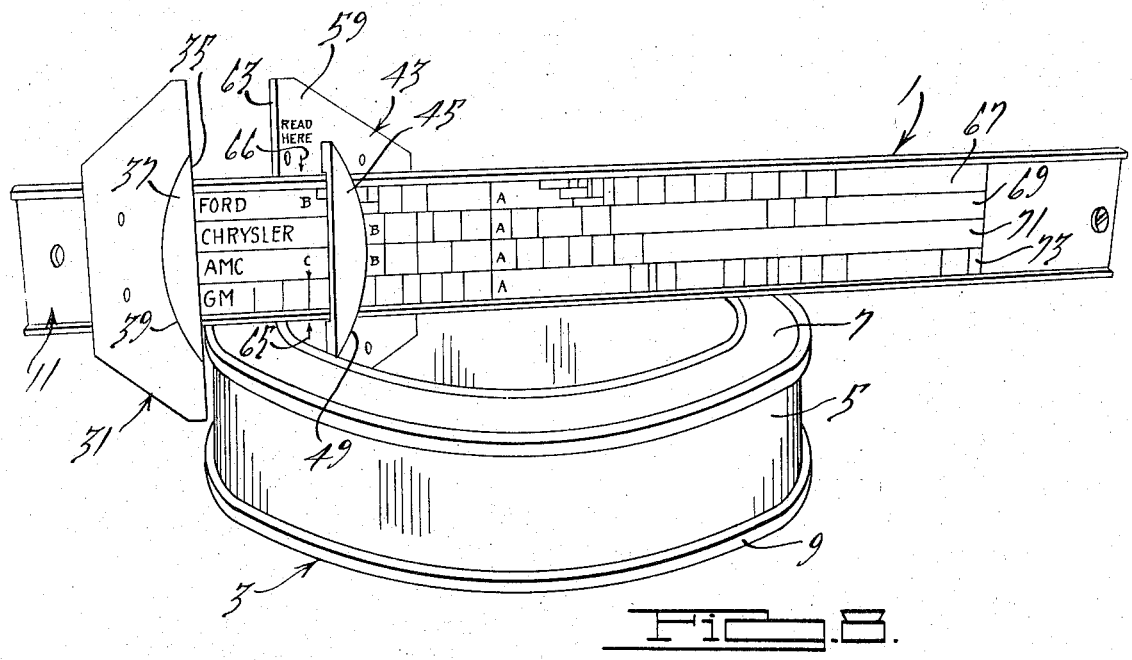
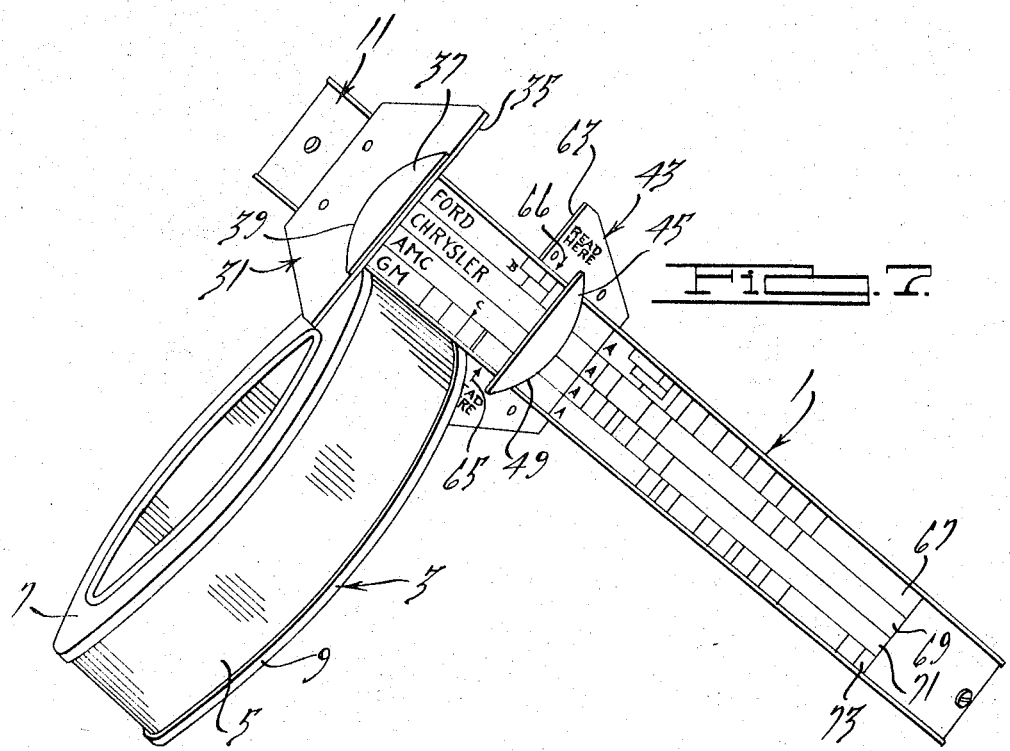

FILTER ELEMENT SELECTOR

BRIEF SUMMARY OF THE INVENTION

It is the purpose of this invention to provide a simple tool that may be used in place of a printed catalogue to enable a gas station attendant, etc. to determine the particular model air filter element that is required to replace one that has been removed from the automobile of a customer. The invention accomplishes this purpose by means of a channel that carries a scale with indicia referring to each of the air filters used on each of selected models of automobiles manufactured by each of selected automobile manufacturers, for example, automobiles manufactured in the U.S. by Ford, Chrysler, American Motors, and General Motors. The indicia representing each filter element are positioned on the channel in such a way that a pointer carried by a movable stop which cooperates with a fixed stop on the channel will read out the model of filter element when measurements taken between the fixed and movable stops correspond to the measurements of that particular filter element.

DESCRIPTION OF THE DRAWINGS

FIG. 1 is a perspective view of the air filter element selector of this invention, certain structural details being ommited to facilitate illustration;

FIG. 2 is a perspective view showing the first measurement that is made of an air filter element;

FIG. 3 is a plan view of the selector device of this invention;

FIG. 4 is an enlarged cross section along line 4-4 of FIG. 3;

FIG. 5 is a side elevation, partly broken away, of the selector of FIG. 3;

FIG. 6 is a bottom plan view of the movable stop showing how the shape may be molded from suitable thermosetting plastic material;

FIG. 7 is a perspective view showing a second measurement that is made of an air filter element; and FIG. 8 is a perspective view showing the third measurement that is made of an air filter element.

DETAILED DESCRIPTION OF THE INVENTION

The filter element selector is designed to be used with a wide variety of air filter elements 3 of the type generally illustrated in FIGS. 2, 7 and 8. These elements are more or less standardized as to shape and are available on the open market. An air filter element 3 comprises a filter body that is annular in shape and formed by reversably pleating filter paper 5 in a radial direction and embedding opposite axial ends in plastic end caps 7 and 9. The air filter element 3 therefore has a characteristic inner diameter, a characteristic radial thickness or distance between the inner and outer diameter, and a characteristic length or distance between the outside faces of the opposite end caps 7 and 9. For the purpose of manufacture, inventory, and cataloguing, each manufacturer of air filter elements gives a unique model number to each different air filter element, and in his catalogue lists the particular automobile models of particular automobile manufacturers for which this particular filter model may be used. In the past, when an automobile driver decided to change the air filter element it was usually necessary for the service station attendant to look up in a catalogue the particular model number of filter for his customer's automobile. Use of the selector 1 may replace the printed catalogue and enable the service station attendant to read directly a particular air filter model that is required to replace the one now used in his customer's automobile. This reading is obtained by using the selector 1 to measure certain dimensions of the element being replaced. The first dimension that is measured is the inner diameter (FIG. 2). In most cases, only this measurement is required to determine the air filter model that is needed. In some cases the reading taken in FIG. 2 will yield more than one model number. In these instances, a second reading is taken (FIG. 7) of the axial thickness (length) of the air filter element being replaced. This will, in most remaining cases, result in only one model number being repeated from the first reading. In a few instances the second measurement will still yield more than one model number being repeated from the first reading and when this occurs, a third measurement of the radial thickness of the element being replaced (FIG. 8) is taken and this will result in only one model number being repeated from both the first and second readings so that the final determination of the replacement model is made.

The air filter element selector 1 includes a linear member or H-shaped channel 11 which has parallel longitudinally extending side flanges 13 and 15 (FIG. 4) which are transversely interconnected by a web 17. The channel bar 11 may be made of plastic or, as shown, of extruded aluminum with flanges or rails 13 and 15, as seen in FIG. 4, along with the recesses 18 that are located adjacent the lower face of the web 17 and the recesses 19 which are located adjacent the upper face of the web 17. Plate scales 21 and 23 are placed in the respective slots 18 and 19 on the bottom and upper web faces and may be secured in place against the web by means of a screw 25 and a nut 27 extending through aligned holes in the plates and the web. As will be mentioned in more detail hereinafter, the plate 23 carries the indicia designating the different models of filter elements and may also include an area 29 (FIG. 3) in which can be placed a logo for the customer or other advertiser. The plate 21 may be imprinted with instructions on how to use the selector 1.

A stationary stop or block member 31 is secured by rivets 32 or other suitable means to the web 17 and preferably has recesses 33 (FIG. 1) that fit over the upper portion of the respective side rails 13 and 15. The block 31 has a measuring face 35 which is perpendicular to the web 17 and also perpendicular to the side flanges 13 and 15. This face 35 extends upwardly into and forms a face 35' of an upper block section 37 which is curved as an arc of a circle. The widest portion of the surface 37 is along the midplane of the channel 11, i.e., the center of the circular segment lies in a perpendicular plane through the midplane of the member 11. The section 37 has a curved measuring face 39 that is perpendicular to the bar 11 and on the opposite side of the block 37 from face 35.

A movable block 43 that is complimentary to block 31 is slidably mounted on the channel 11. It includes an upper section 45 that may include face 47 that is parallel to the faces 35 and 35' on the upper section 37. The section 45 is similar in shape to block 37, but on the opposite hand, and has an outer curved measuring face 49 that corresponds to and cooperates with the face 39.

The block 43 is slidably mounted on the side flanges 13 and 15 by means of grooves 51 that are shaped to suit the shape of the flanges 13 and 15, these grooves being formed on the inner faces of pairs of side rail sections 53 and 55 that are part of the block 43. Horizontal flanges 57 and 59 extend outwardly from the side rails 53 and 55 and are interconnected by a cross bar 58 of which the section 45 is the upper part. The sections 57 and 59 have aligned measuring faces 61 and 63 which lie in the same plane and are perpendicular to the web 17 and parallel to the face 35. These faces are also parallel to the face 47 but are spaced from it in the direction of the member 31. Further, they are spaced below the face 47 as is apparent in FIG. 1. The flat upper surfaces of the horizontal flanges 57 and 59 have pointers or arrows 65 and 66 which indicate to the user the longitudinal box on scale 21 that is to be read after a given measurement.

As seen best in FIG. 3, the scale 21 has four parallel longitudinally extending rows 67, 69, 71, and 73, each row being for a different automobile manufacturer. A transverse line 75 marked AAAA (one A for each row) divides the scale into a right portion containing only A row portions and a left portion containing B portions and C portions as indicated, the C portions being only in row 73 and being separated from a B portion by the line 77. Each of the row portions is further subdivided into boxes 78 which contain model numbers, such as indicated by the horizontal lines 79. Black blocks 81 appear adjacent each box 78 to help in the reading.

All model numbers to the right of line 75 are determined by the measurement taken of the inner diameter of the air filter 3 as indicated in FIG. 2. This line 75 is positioned just to the left of the smallest inner diameter measurement of a filter element whose model number appears on the scale. In this measurement the arcuate faces 39 and 49 of the raised sections 37 and 45 are brought into contact with opposite ends of a diameter on the inside of a filter 3. Bearing in mind the make of the automobile which tels him which row to read, the user of the selector then follows arrow 65 or 66 to the black block 81 that is in line with the arrow and looks for the model number 79 in the box 78 adjacent the black block. If more than one model number appears in the box, it is necessary to make a measurement of the axial thickness of the filter 3 as shown in FIG. 7. In this measurement the faces 35 and 61–63 of the fixed and movable blocks 31 and 43 are employed and the user follows the arrows 65 or 66 to read the model number in line therewith in the appropriate column for the made of automobile involved. In most cases only one model number from the reading on the A section will be repeated opposite the arrow in the B section. However, for certain General Motors cars a third measurement as indicated in FIG. 8 may be required by using the faces 35 and 61–63 to measure the radial thickness of filter 3. The arrow 65 is then followed into the C section to pick up the model number that has been repeated from the A and B sections. It will be seen that the position of the B and C boxes on the scale plate 23 is determined by the thickness and height measurement of the various models of filter elements listed in the boxes. Since these are smaller than the diameters the use of surfaces 61–63, which are spaced inwardly from the face 47 on raised section 45, as measuring surfaces facilitate the placement of the B and C boxes on the scale.

Thus, the selector 1 provides a simple device to enable a car service attendant to quickly determine the model number of a replacement filter element for his customer. The structure of the selector is such as to enable it to be readily manufactured, viz., the stops 31 and 43 may be molded from thermosetting plastic, the channel 11 may be extruded aluminum or other metal or plastic, and the scales 21 and 23 of metal, plastic, or fibrous sheet materials. The hole 83 in channel 11 permits the selector to be hung in a convenient place in the garage where it is available for instant use.

Modifications in the specific features and arrangements shown may be made without departing from the spirit and scope of the invention.

I claim;

1. A selector device for measuring first, second, and third dimensions of an element and for indicating the model number of said element in accordance with the measurement of said dimensions comprising measuring means for respectively and separately measuring each of said first, second, and third dimensions of said element, pointer means operated by said measuring means for indicating the magnitude of a measurement, and scale means containing rows of model numbers, said scale means comprising first, second, and third divisions of model numbers in said rows, said first division containing all of said model numbers and the positions of said model numbers on the first division of said scale means being in accordance with the magnitude of the first dimension of an element as determined by the measuring means, said second division containing each model number of element that has a dimension in common with another model number and the positions of said model numbers on the second division of said scale means being in accordance with the magnitude of the second dimension of an element as determined by the measuring means, said third division containing each model number of element that has two dimensions in common with another model number and the positions of said model numbers on the third division of said scale means being in accordance with the magnitude of the third dimension of an element as determined by the measuring means, said pointer means and the positions of the model numbers in said rows being arranged and cooperating to indicate the model numbers having the dimensions measured by the measuring means.

2. A selector device for measuring and indicating the model number of an annular air filter element or the like comprising an elongated bar having parallel longitudinal side rails on opposite sides and a longitudinal web between and connecting said side rails, a pair of cooperating measuring blocks on said bar, one of said blocks being in fixed position on the bar adjacent an end thereof, the other block being mounted on and slidable on said side rails along the length of the bar, said blocks having a first pair of cooperating surfaces for measuring the inner diameter of an element, a scale on said web containing at least one longitudinal row of model numbers, said model numbers being in first positions spaced along the row in accordance with the inner diameter of said annular element, said movable block having a pointer cooperating with said model numbers to designate the model number of an element in accordance with the position of said movable block when said cooperating surfaces are spaced apart a distance dictated by the measurement of the inner diameter of an element, said blocks having a second pair of cooperating surfaces for measuring the length of the annular element, said scale row containing duplicates of certain of said model numbers and said duplicates being located in second positions in said row in accordance with the length of the annular element as measured by the distance between said second pair of cooperating surfaces when said surfaces are respectively in contact with opposite ends of the element.

3. A device as set forth in claim 2 wherein said second pair of cooperating surfaces are adapted to measure the thickness of said annular element and said scale row contains duplicates of said model numbers located in third positions in said row in accordance with the thickness of the annular element as measured by the distance between said second pair of cooperating surfaces when said surfaces are respectively in contact with the inner and outer peripheries of said annular element.

4. A device as set forth in claim 3 wherein each of said blocks has an upraised portion on the top thereof, said first pair of sufaces being formed on said upraised portions and facing in opposite directions, said second pair of cooperating surfaces on said blocks facing each other and having a different longitudinal separation from each other than the first pair.

5. A device as set forth in claim 4 wherein said first pair of surfaces are convex.

6. A device as set forth in claim 5 wherein said second pair of surfaces are flat and substantially normal to said scale and to the longitudinal axis of the base.

7. A device as set forth in claim 6 including a plate engaging the top of said web, groove means in the side rails receiving opposite longitudinal edges of the plate, said scale being formed on the top surface of said plate, and means securing the plate in longitudinal position on the web.

8. A device as set forth in claim 7 wherein said scale contains a plurality of rows of model numbers, each said row containing model numbers classified according to a common manufacturer.

9. A device as set forth in claim 8 including boxes formed on the scale, said model numbers being positioned inside said boxes, and a locator spot for each box on the scale cooperating with the pointer to facilitate location of a model number.

* * * * *